(12) United States Patent
Mikan et al.

(10) Patent No.: US 7,920,698 B1
(45) Date of Patent: Apr. 5, 2011

(54) MICROPHONE SYSTEMS FOR TELEPHONES

(75) Inventors: Jeffrey Mikan, Cumming, GA (US); Justin McNamara, Atlanta, GA (US); Fulvio Cenciarelli, Suwannee, GA (US); Anastasios Kefalas, Alpharetta, GA (US); Adrianne Luu, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 999 days.

(21) Appl. No.: 11/550,268

(22) Filed: Oct. 17, 2006

(51) Int. Cl.
*H04M 9/00* (2006.01)
*H04M 1/00* (2006.01)
(52) U.S. Cl. .............................. 379/433.03; 379/433.13
(58) Field of Classification Search ............. 379/433.01, 379/433.11, 433.13, 433.03; 455/550.1, 455/575.1, 575.3
See application file for complete search history.

(56) References Cited

U.S. PATENT DOCUMENTS

| 6,052,464 A | * | 4/2000 | Harris et al. | 379/433.07 |
| 6,429,817 B1 | * | 8/2002 | Creigh et al. | 343/702 |
| 2003/0132884 A1 | * | 7/2003 | Ragner et al. | 343/702 |

* cited by examiner

*Primary Examiner* — Fan Tsang
*Assistant Examiner* — Phylesha Dabney
(74) *Attorney, Agent, or Firm* — Parks IP Law LLC; Mickki D. Murray, Esq.

(57) ABSTRACT

A microphone system that may be used in a mobile telephone is disclosed. In one embodiment, a microphone is housed within a first housing portion and is extended therefrom when a second portion of the housing is pivoted to an open position relative to the first housing portion. The microphone is retracted back into the first housing portion when the second housing portion is slidably affixed to the first housing portion and the microphone is extended from the first housing portion when the second housing portion is moved relative to an open position relative to the first housing portion and the microphone is retracted into the first housing portion when the second housing portion is moved into a closed position relative to the first housing portion. In another embodiment, a manually actuated scroll gear is used to extend and retract the microphone. In yet another embodiment, a motor is used to extend and retract the microphone.

6 Claims, 11 Drawing Sheets

MICROPHONE SYSTEMS FOR TELEPHONES

TECHNICAL FIELD

The present invention relates generally to microphones and, more particularly, to telephone microphones that can be extended and retracted in response to manipulation of portions of the telephone.

BACKGROUND OF THE INVENTION

Early mobile telephones typically comprised a hand held unit that included a microphone, a speaker, a transceiver, a keypad, and a display unit. These units tended to be somewhat bulky and cumbersome to carry. Thus, lighter and more compact units were eventually developed. One such design is commonly referred to as a "flip-open" style telephone wherein the telephone comprises two portions that are pivotally interconnected. When not in use, the two portions are positioned in a face contacting relationship to protect the display, the keypad, or other elements of the telephone. The result of this design is a mobile telephone that is compact without hindering its functionality. To utilize the phone, one portion is pivoted away from the other to expose both portions for use.

Another mobile telephone design is commonly known as a "slide" style telephone. In this design, one portion of the telephone slides away from the second portion to expose the display, the keypad, or other elements of the telephone and to reduce the overall size of the telephone without hindering its functionality. To utilize the phone, the slidable portion is moved to an open position, exposing the keypad, screen, or other elements for use.

Yet another mobile telephone design is commonly known as the "open-face" style telephone. In this design, the display and keypad are fixed on the face of the telephone.

The size and weight of mobile telephones continues to decrease as mobile telecommunication technologies improve. The present mobile telephones, although small and easy to carry, can hinder or provide the perception of hindering the phones functionality, particularly with respect to the microphone element. The microphone is generally positioned proximate to a user's mouth. As mobile telephone sizes decrease, the position of the microphone moves farther away from the user's mouth. This can hinder the microphone's ability to capture speech, or at least alter the user's perception of the microphone's ability to capture speech based upon the location of the microphone away from the user's mouth.

Thus, there is a need for a telephone microphone that is extendible when the user manipulates at least a portion of the telephone.

A further need exists for an automatically extending microphone that can be incorporated into "flip-open" and "slide" style telephones. An additional need exists wherein the microphone is also automatically retracted.

Yet a further need exists for an automatically extending microphone design that is resistant to wear or breakage and requires minimal moveable parts.

SUMMARY OF THE INVENTION

The present invention provides the solutions to the problems identified above. In accordance with one embodiment of the present invention, there is provided a microphone system for a telephone including at least one slide track slidably received within the telephone and non-movably affixed to an elongated microphone, the slide track(s) having a first engaging means disposed along at least a portion of the slide track(s); at least one gear rotatably supported within the telephone and having means for interlocking with the first engaging means; and means for rotating the gear by rotational movement of a portion of the telephone. The microphone system can also include a diaphragm configured to receive analog sound signals and convert the analog sound signals into electrical signals, an audio wire connected to the diaphragm, and a housing for enclosing and protecting the diaphragm and audio wire. The microphone system can also include at least one extendible member affixed to the slide track(s), wherein the extendible member can be telescopic.

In accordance with another embodiment of the present invention, there is provided a telephone including a housing having a first portion and a second portion, the first portion being pivotally connected to the second portion by a rod disposed between the first portion and the second portion; at least one slide track disposed within one of the first and second portions, the slide track(s) being non-movably affixed to a microphone and having a first engaging means disposed along at least a portion of the slide track(s); and at least one gear affixed to the rod, the gear having means for interlocking engagement with the first engaging means. The microphone can include a diaphragm configured to receive analog sound signals and convert the analog sound signals into electrical signals, an audio wire connected to the diaphragm, and a housing for enclosing and protecting the diaphragm and audio wire. The telephone of can also include at least one guide tube mounted within one of the first and second portions and slidably supporting the slide track(s) therein. The telephone can also include at least one extendible member affixed to the slide track(s). The extendible member(s) can be telescopic.

In accordance with yet another embodiment of the present invention, there is provided a microphone system for a telephone having a telephone housing including a first housing portion pivotally attached to a second housing portion and being selectively pivotable between an open position and a closed position, the microphone system including a flexible slide track having a plurality of first gear teeth thereon and being slidably supported within one of the first and second housing portions; a microphone having a portion thereof received within one of the first and second housing portions and non-movably attached to the flexible slide track; and at least one gear rotatably supported within one of the first and second housing portions and in intermeshing engagement with the first gear teeth, the gear constructed to rotate in a first direction when one of the first and second portions is pivoted to the open position and the gear(s) constructed to rotate in a second direction opposite to the first direction when one of the first and second portions is pivoted to the closed position. The microphone system wherein the first and second housing portions can be pivotally coupled together by a flip rod and the gear(s) is attached to the flip rod.

In accordance with yet another embodiment of the present invention, there is provided a microphone system for a telephone having a housing, the microphone system including a flexible slide track having a plurality of first gear teeth thereon and being slidably supported within the housing; a microphone having a portion thereof received within the housing and non-movably attached to the flexible slide track; at least one gear rotatably supported within the housing and in intermeshing engagement with the first gear teeth, the gear(s) constructed to rotate when at least one intermediate gear is rotated, the intermediate gear(s) having a plurality of second gear teeth; and a manually rotatable scroll gear rotatably supported partially within the housing and in intermeshing engagement with the second gear teeth, the scroll gear constructed to rotate in a first direction when rotated thereby causing the intermediate gear and consequently the gear(s) to rotate in a second direction. The telephone microphone including a diaphragm configured to receive analog sound signals and convert the analog sound signals into electrical signals; an audio wire connected to the diaphragm; and a housing for enclosing and protecting diaphragm and the audio wire. The telephone can further include at least one guide tube mounted within the housing and slidably supporting the slide track therein. The microphone telephone further including at least one extendible member affixed to the at least one slide track. The extendible member(s) can also be telescopic.

Further embodiments are provided wherein a motor is used to extend and retract the microphone. The motor may be activate/deactivated based upon an input received from a sensor or a button. The sensor or button may further be activated based upon movement of at least one portion of the telephone or may be actuated by a user.

The present invention provides telephones that include auto-extendible and auto-retractable microphone systems as well as manually actuated extendible and retractable microphone systems for use in many telephone types.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1A:
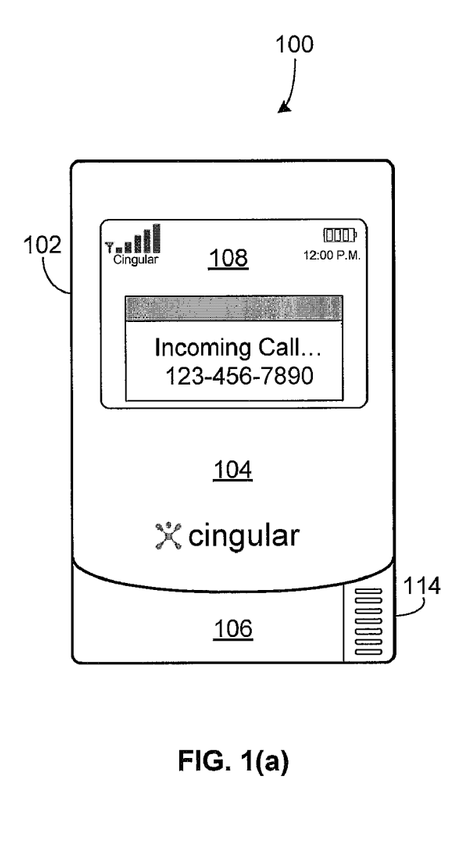
FIGS. 1(a) and (b) are perspective views of a "flip-open" telephone in the closed and open positions, respectively, in accordance with one embodiment of the present invention.
Figure 1B:
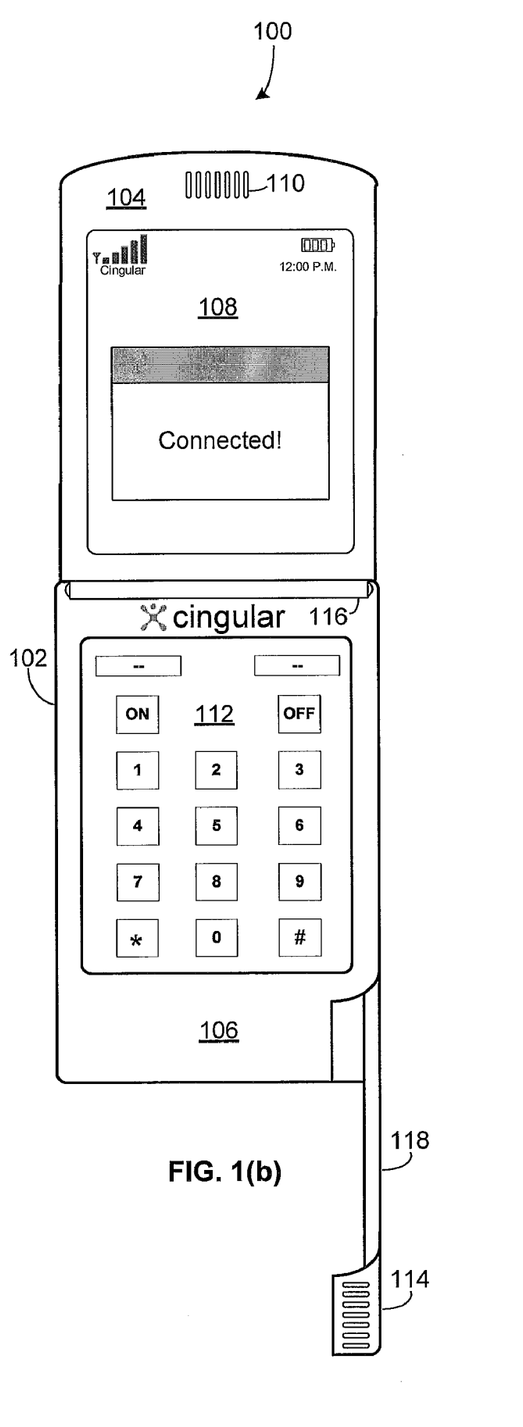

Referring now to the drawings in which like numerals represent like elements throughout the several views, FIG. 1 depicts one exemplary embodiment of a "flip-open" telephone 100 according to the present invention. FIG. 1(a) illustrates the telephone 100 in its closed, stand-by position, while FIG. 1(b) illustrates the telephone 100 in its open, operating position.

The telephone 100 has a body or housing 102 that consists of an upper, first portion 104 and a lower, second portion 106. Disposed on the outside of the first portion 104 may be a display 108. As best shown in FIG. 1(b), disposed on the inside of the first portion 104 may be another display 108 and a speaker 110. A keypad 112 may be disposed on the second portion 106. These features are standard features present in prior art telephones. Thus, the construction and operation of such components will not be discussed in detail herein. However, a microphone 114 may be extendibly attached to one of the portions; here, the second portion 106. The arrangement of the first portion 104 and the second portion 106 may be any arrangement known to those skilled in the art that is compatible with the teachings of the present invention.

In this exemplary embodiment, the telephone 100 has a flip rod 116 that is disposed between and pivotally connects the first portion 104 to the second portion 106. When the user rotates the first portion 104 from the closed position, as shown in FIG. 1(a), to the open position, as shown in FIG. 1(b), the flip rod 116 is rotated. Upon rotation of the flip rod 116, an extendible member 118 with the microphone 114 affixed thereto is extended, as shown in FIG. 1(b).

Figure 2:
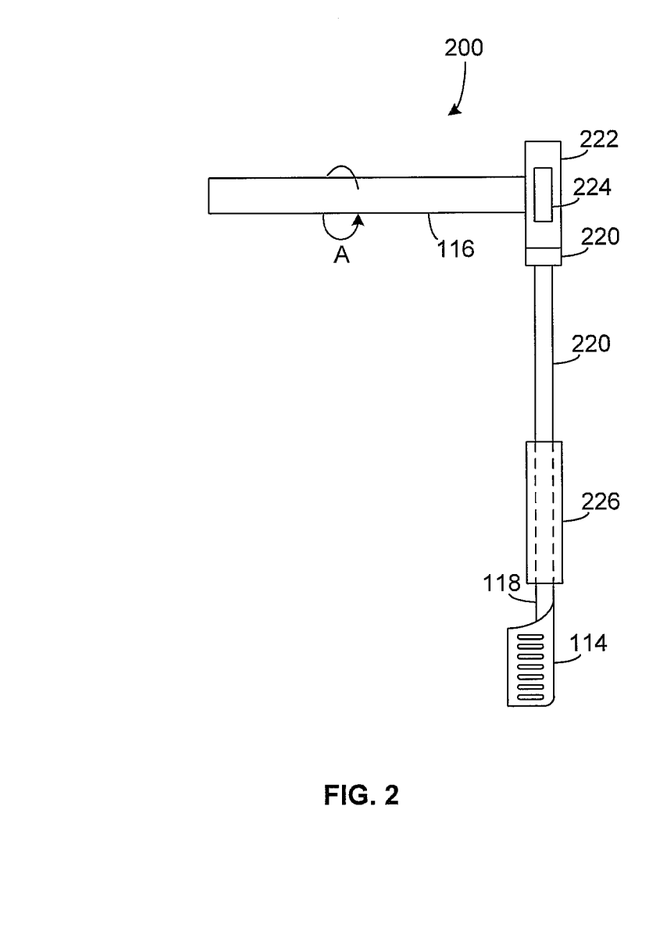
FIG. 2 is a front view of an auto-extending and auto-retracting microphone system for use in a "flip-open" telephone, in accordance with one embodiment of the present invention.
Figure 3A:
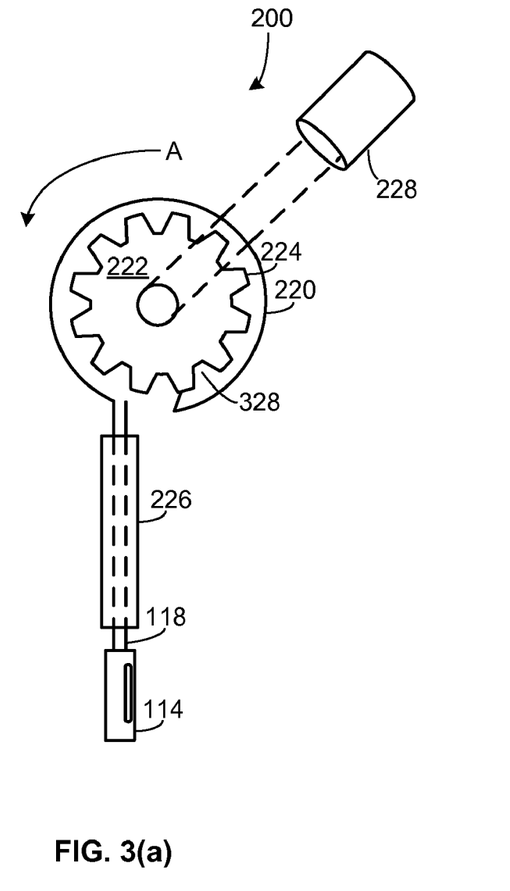
FIGS. 3(a) and (b) are side views of an auto-extending and auto-retracting microphone system for use in a "flip-open" telephone, in accordance with one embodiment of the present invention.
Figure 3B:
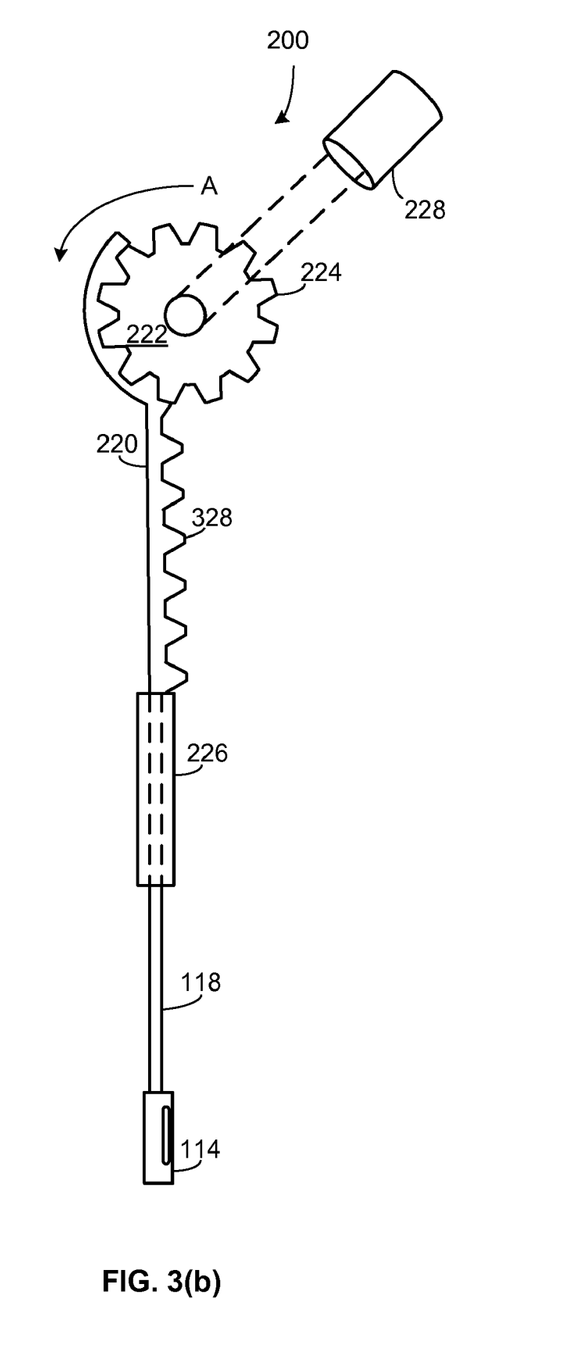

Referring now to FIGS. 2 and 3, there is depicted an exemplary embodiment of a single gear auto-extending and auto-retracting microphone system 200 of the present invention, for use in the "flip-open" telephone 100 depicted in FIGS. 1(a) and (b). The illustrated embodiment includes an elongated slide track 220 that has a plurality of slide track teeth 328 (as best shown in FIG. 3(b)) disposed therealong. One end of the slide track 220 is affixed to the extendible member 118 by any suitable means such as, but not limited to, adhesive, solder, rivets, clips, clamps, snaps, any combination thereof, and the like. It is contemplated that the extendible member 118 and the slide track 220 may be combined such that a portion of the slide track 220 is fabricated without slide track teeth 328. It is further contemplated that the extendible member 118 can be telescoping such that a plurality of sections of decreasing diameter are used to minimize length in the retracted position and maximize length in the extended position. The material or combination of materials used to fabricate the extendible member 118, the slide track 220, and the slide track teeth 328 can be any known to those skilled in the art. As previously mentioned, the microphone 114 is affixed to the extendible member 118 at one end. The distal end of the slide track 220 is affixed to a wheel or gear 222 by any suitable means such as, but limited to adhesive, solder, rivets, clips, clamps, snaps, friction, any combination thereof, and the like.

As seen in FIG. 2, the gear 222 is disposed at one end of the flip rod 116. In this embodiment, the gear 222 has a plurality of gear teeth 224 that are adapted to intermesh with a plurality of slide track teeth 328 disposed on the slide track 220 (as best shown in FIG. 3). The type of material used to fabricate the gear 222 can be any known to those skilled in the art. Further, the gear 222 and the gear teeth 224 may be any size, and any number of gear teeth 224 may be used. In an alternative embodiment, a transmission of gears may be used. This may be useful for small form factor telephones that cannot facilitate a single large gear, but may be able to facilitate a plurality of interconnected smaller gears. Also, the slide track teeth 328 are designed to provide an intermeshing engagement with the gear teeth 224 such that the microphone 114 is extended to a desired position when the first portion 104 is pivoted to an open position (FIG. 1(b)), as will be discussed in further detail below.

When the flip rod 116 is turned in the direction of the arrow A, the illustrated first portion 104 (see FIG. 1(a) and (b)) is rotated away from the second portion 106, the slide track 220, is likewise rotated about the gear 222. The slide track teeth 328 engage with the gear teeth 224, thereby forcing the extendible member 118 and consequently the microphone 114 to move linearly into the extended position. Alternatively, if no extendible member 118 is used, slide track 220 forces the microphone 114 to move linearly into the extended position. The movement of the slide track 220 and/or the extendible member 118 may be guided in a desired axial direction by the provision of one or more guide tubes 226. Conversely, when the flip rod 116 is turned in the opposite direction, by rotating the first portion 104 towards the second portion 106 to close the telephone 100, the slide track teeth 328 engage with the gear teeth 224, thereby retracting the extendible member 118 and consequently the microphone 114 into the respective retracted positions, as shown in FIGS. 1(a) and 3(a).

Electrical interconnection of the microphone 114 with the internal electronics of the telephone 100 may be provided with upper and lower contacts (not shown). The upper contact ensures electrical interconnection of the microphone 114 when it is in a retracted position, while the lower contact maintains an electrical interconnection of the microphone 114 when it is in an extended position, thus providing a useable microphone 114 when the telephone is being used, for example, in a speaker phone mode.

Figures 4A, 4B:
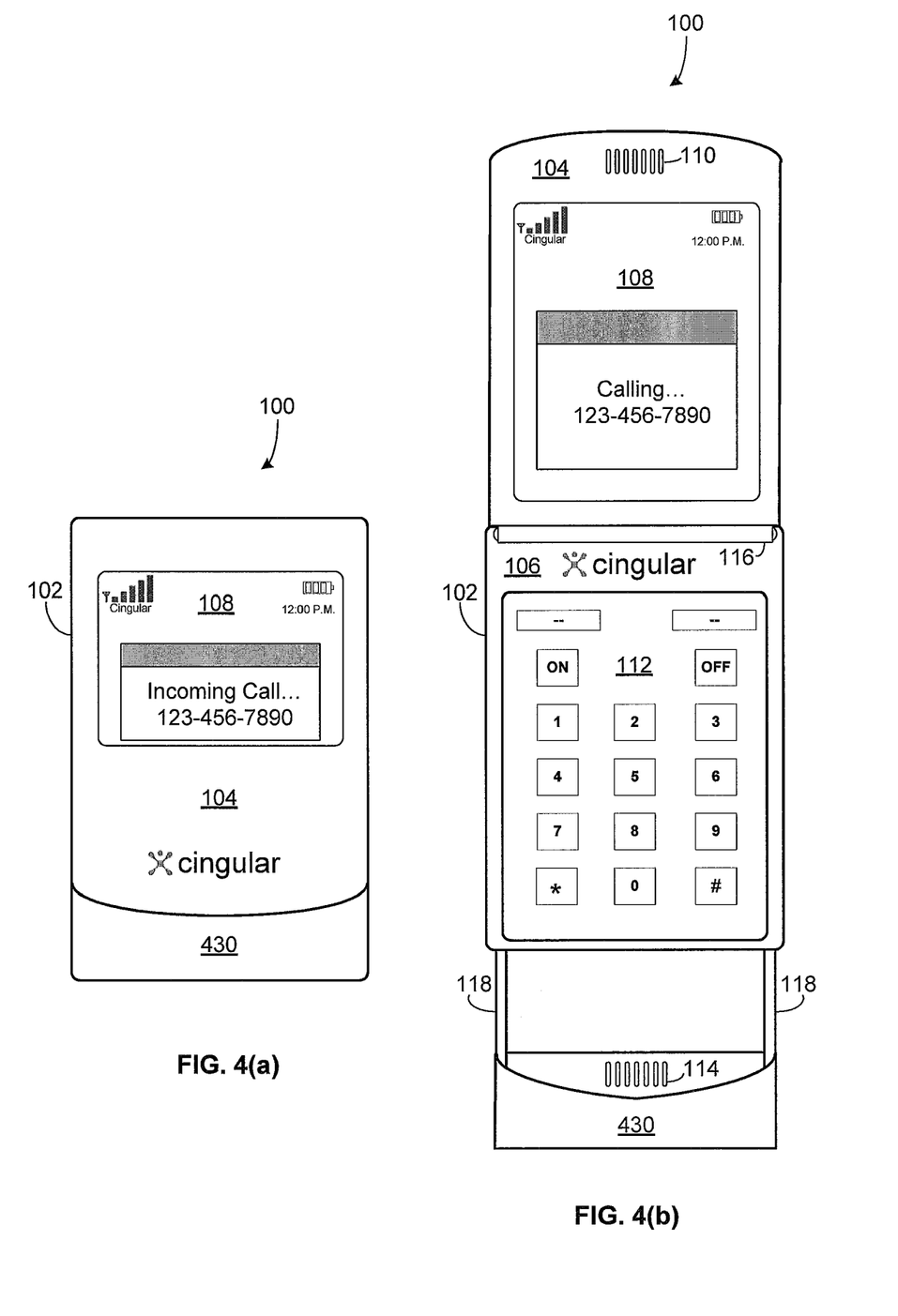
FIGS. 4(a) and 4(b) are perspective views of a "flip-open" telephone in the closed and open positions, respectively, in accordance with another embodiment of the present invention.

Referring now to FIGS. 4(a) and (b) there is depicted another exemplary embodiment of a "flip-open" telephone 100 according to the present invention. In this exemplary embodiment, the telephone 100 has a flip rod 116 that is disposed between and pivotally connects the first portion 104 to the second portion 106. When the user rotates the first portion 104 from the closed position, as shown in FIG. 4(a), to the open position, as shown in FIG. 4(b), the flip rod 116 is rotated. In the previous exemplary embodiment (FIGS. 1, 2 and 3), the microphone 114 is extended from a single extendible member 118 and slide track 220. In the present exemplary embodiment, two slide tracks (not shown) and two extendible members 118 are utilized to support a third portion 430 of the telephone 100. The illustrated microphone 114 is built-in to the third portion 430.

Figure 5:
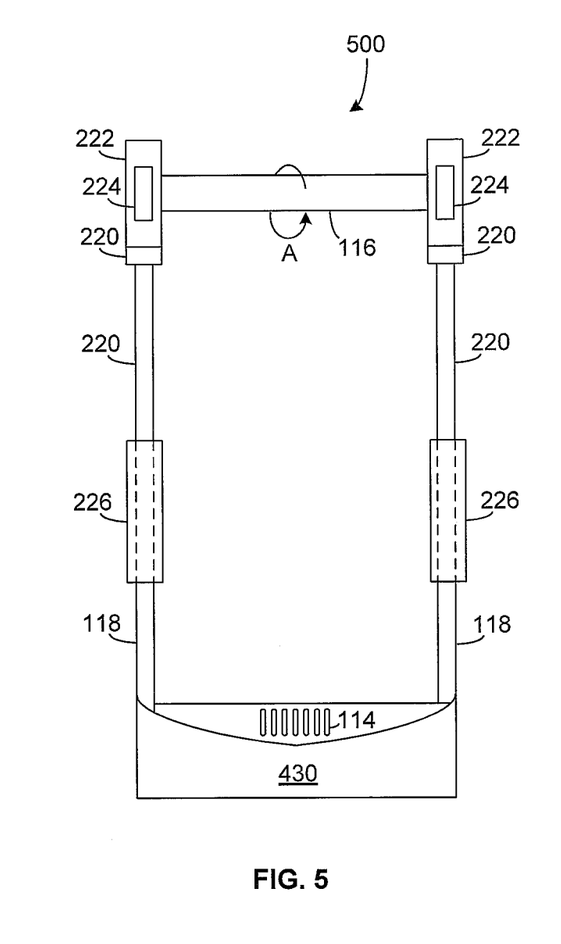
FIG. 5 is a front view of an auto-extending and auto-retracting microphone system for use in a "flip-open" telephone, in accordance with another embodiment of the present invention.
Figure 6A:
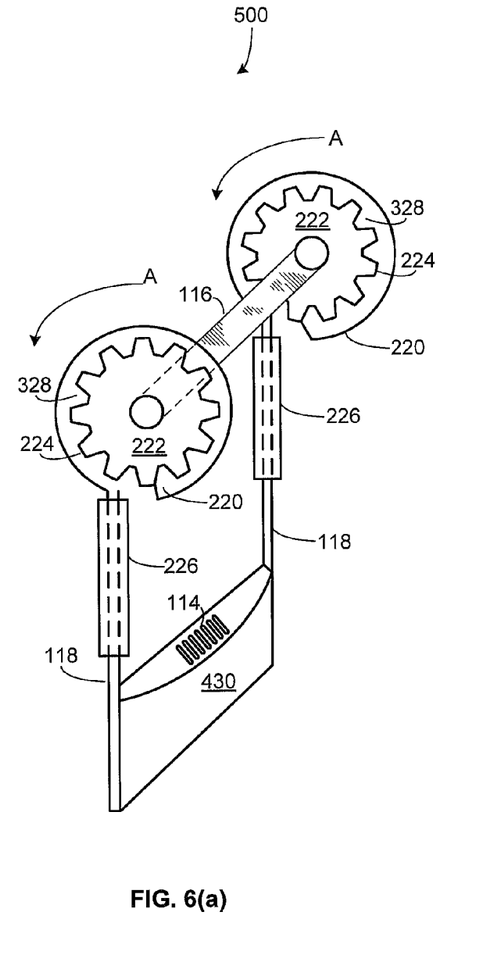
FIGS. 6(a) and (b) are perspective views of an auto-extending and auto-retracting microphone system for use in "flip-open" telephone, in accordance with another embodiment of the present invention.
Figure 6B:
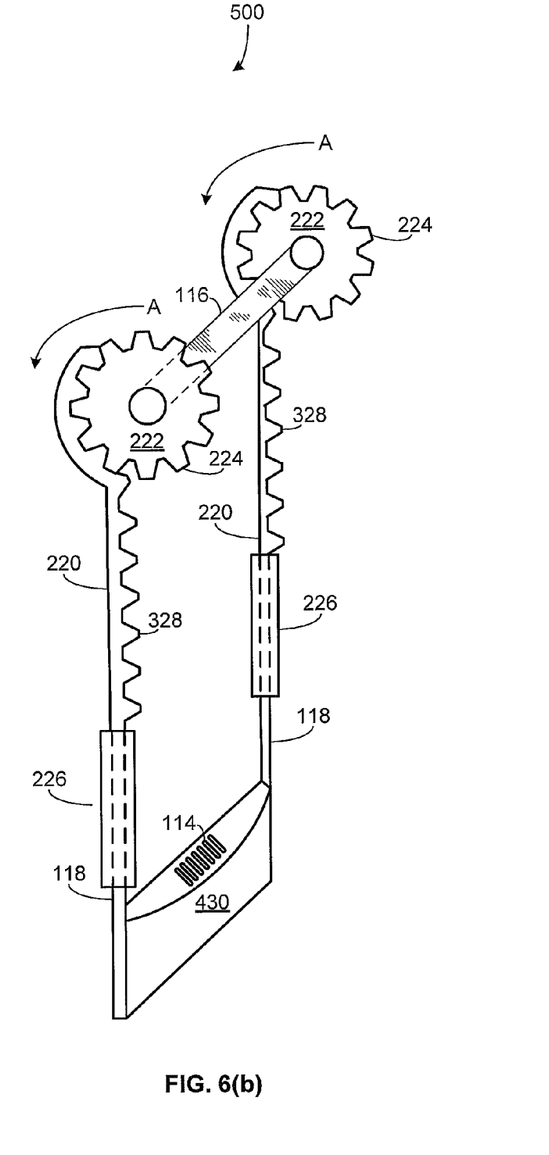

Referring now to FIGS. 5 and 6, there is depicted an exemplary embodiment of a dual gear auto-extending and auto-retracting microphone system 500 according to the present the present invention, for use in the "flip-open" telephone 100 depicted in FIGS. 4(a) and (b). This embodiment of the present invention includes two slide tracks 220, each of which have a plurality of slide track teeth 328 disposed therealong. One end of each slide track 220 is affixed to an extendible member 118 by any suitable means such as, but not limited to, adhesive, solder, rivets, clips, clamps, snaps, any combination thereof, and the like. It is contemplated that the extendible members 118 and the slide tracks 220 can be combined such that a portion of each slide track 220 is fabricated without slide track teeth 328. It is further contemplated that the extendible members 118 can be telescoping such that a plurality of sections of decreasing diameter are used to minimize length in the retracted position and maximize length in the extended position. The material or combination of materials used to fabricate the extendible members 118, the slide tracks 220, and the slide track teeth 328 can be any known to those skilled in the art. As previously described, the illustrated third portion 430 is affixed to the extendible members 118. Alternatively, the third portion 430 can be directly affixed to the slide tracks 220. The other ends of the slide tracks 220 are each affixed to a wheel or gear 222 by any suitable means such as, but limited to adhesive, solder, rivets, clips, clamps, snaps, friction, any combination thereof, and the like.

As seen in FIG. 5, a gear 222 is disposed at both ends of the flip rod 116. In this embodiment, the gears 222 have a plurality of gear teeth 224 that are adapted to intermesh with a plurality of slide track teeth 328 disposed along the slide tracks 220. The type of material used to fabricate the gears 222 can be any known to those skilled in the art. Further, the gears 222 and the gear teeth 224 may be any size, and any number of gear teeth 224 may be used. In an alternative embodiment, a transmission of gears can be used. This may be for small form factor telephones that cannot facilitate a single large gear, but may be able to facilitate a plurality of interconnected smaller gears. Also, slide track teeth 328 are designed to provide an intermeshing engagement with the gear teeth 224 such that the third portion 430 and the microphone 114 are extended to a desired position when the first portion 104 is pivoted to an open position (FIG. 4(b)), as will be discussed in further detail below.

Now referring to FIGS. 6(a) and (b), when the flip rod 116 is turned in the direction of the arrow A, wherein the illustrated first portion 104 (see FIGS. 4(a) and (b)) is rotated away from the second portion 106, the slide tracks 220 are likewise rotated about the gears 222 and the slide track teeth 328 engage with the gear teeth 224, thereby forcing the extendible members 118 and consequently the third portion 430 and microphone 114 to move linearly into the extended position. The movement of the slide tracks 220 and/or the extendible members 118 may be guided in a desired axial direction by the provision of guide tubes 226. Conversely, when the flip rod 116 is turned in the opposite direction, by rotating the first portion 104 towards the second portion 106 to close the telephone 100, the slide track teeth 328 engage with the gear teeth 224, thereby retracting the extendible members 118 and consequently the microphone 114 into the respective retracted positions, as shown in FIGS. 4(a) and 6(a).

Electrical connection of the microphone 114 with the internal electronics of the telephone 100 may be provided with upper and lower contacts (not shown). The upper contact ensures electrical interconnection of the microphone 114 when it is in a retracted position, while the lower contact maintains an electrical interconnection of the microphone 114 when it is in an extended position, thus providing a useable microphone 114 when the telephone is being used, for example, in a speaker phone mode.

Figure 7A:
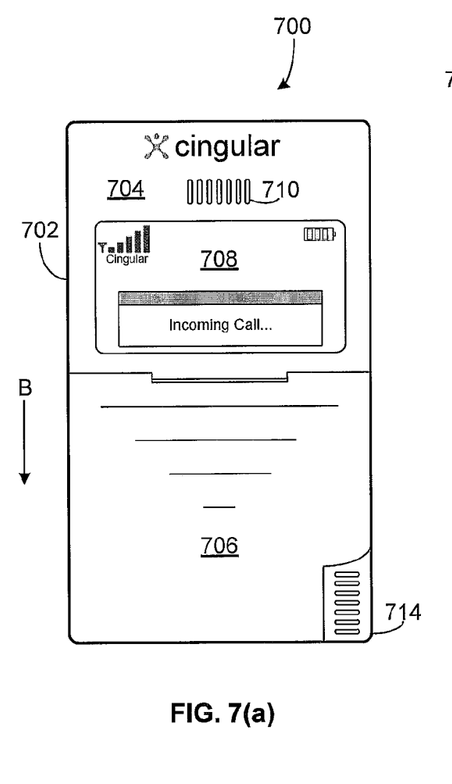
FIGS. 7(a) and (b) are perspective views of a "slide" style telephone in the closed and open positions, respectively, in accordance with one embodiment of the present invention.
Figure 7B:
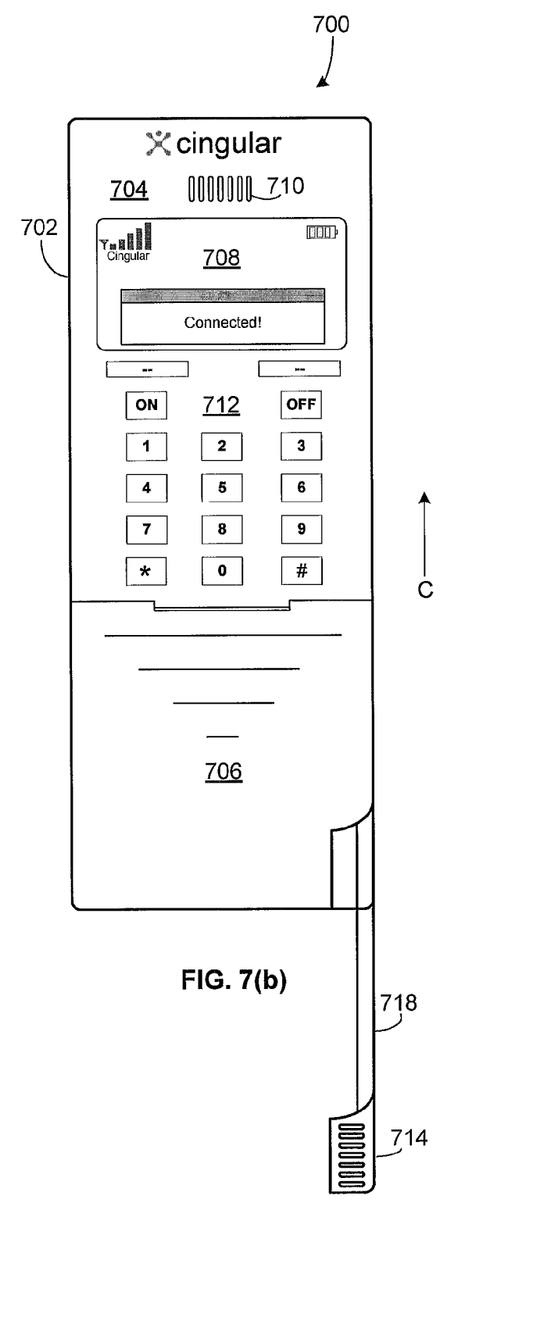

Referring now to FIGS. 7(a) and (b) there is depicted another exemplary embodiment of the present invention. This style of telephone is generally known as a "slide" style telephone. FIG. 7(a) illustrates the "slide" style telephone 700 in its closed, stand-by position, while FIG. 7(b) illustrates the telephone 700 in its open, operating position.

The telephone 700 has a body or housing 702 that consists of an upper, first portion 704 and a lower, second portion 706. Disposed on the first portion 704 may be a display 708 and a speaker 710. As best shown in FIG. 7(b), disposed on the first portion 704 may also be a keypad 712. These features are standard features present in prior art telephones. Thus, the construction and operation of such components will not be discussed in detail herein. However, a microphone 714 may be extendibly attached to the second portion 706. The arrangement of the first portion 704 and the second portion 706 may be any arrangement known to those skilled in the art that is compatible with the teachings of the present invention.

In this embodiment, the telephone 700 has cooperatively engaging tracks (not shown) that are cooperatively disposed on the first portion 704 and the second portion 706 of the body 702, respectively. The engaging tracks facilitate the movement of the second portion 706 away from the first portion 704. The engaging tracks may be combined with the slide tracks 820 and 832. As illustrated in FIG. 7(b), when the second portion 706 of the housing 702 is slid to the open position, a microphone 714 is extended out of the housing 702. This extension occurs automatically when the user slides the second portion 706 to the open position.

Figure 8A:
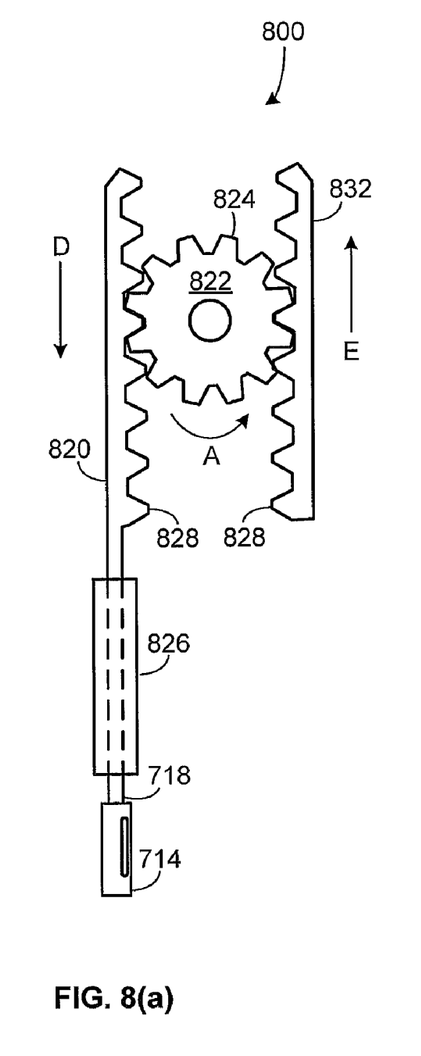
FIGS. 8(a) and (b) are side views of an auto-extending and auto-retracting microphone system for use in "slide" style telephone, in accordance with one embodiment of the present invention.

Referring now to FIGS. 8(a) and (b) there is depicted an exemplary embodiment of a single gear auto-extending and auto-retracting microphone system 800 of the present invention, for use in the "slide" style telephone. As can be seen in these Figures, there is a first slide track 820 (not visible in FIG. 7) slidably disposed within the first portion 704. The first slide track 820 can be fabricated from any suitable material. The first slide track 820 has a plurality of slide track teeth 828 formed thereon for intermeshing engagement with gear teeth 824 of a wheel or gear 822 rotatably mounted within the first portion 704. One end of the first slide track 820 can be affixed to an extendible member 718 by any suitable means such as, but not limited to, adhesive, solder, rivets, clips, clamps, snaps, any combination thereof, and the like. The microphone 714 can be affixed to the end of the extendible member 718. It is contemplated that the extendible member 718 and the first slide track 820 can be combined such that a portion of the first slide track 820 is fabricated without slide track teeth 828. It is further contemplated that the extendible member 718 can be telescoping such that a plurality of sections of decreasing diameter are used to minimize length in the retracted position and maximize length in the extended position. The other end of the first slide track 820 can be affixed to the gear 822 by any suitable means such as, but not limited to, adhesive, solder, rivets, clips, clamps, snaps, friction, any combination thereof, and the like. The material or combination of materials used to fabricate the extendible member 718, the first slide track 820, the gear 822, the gear teeth 824, and the slide track teeth 828 can be any known to those skilled in the art.

Figure 8B:
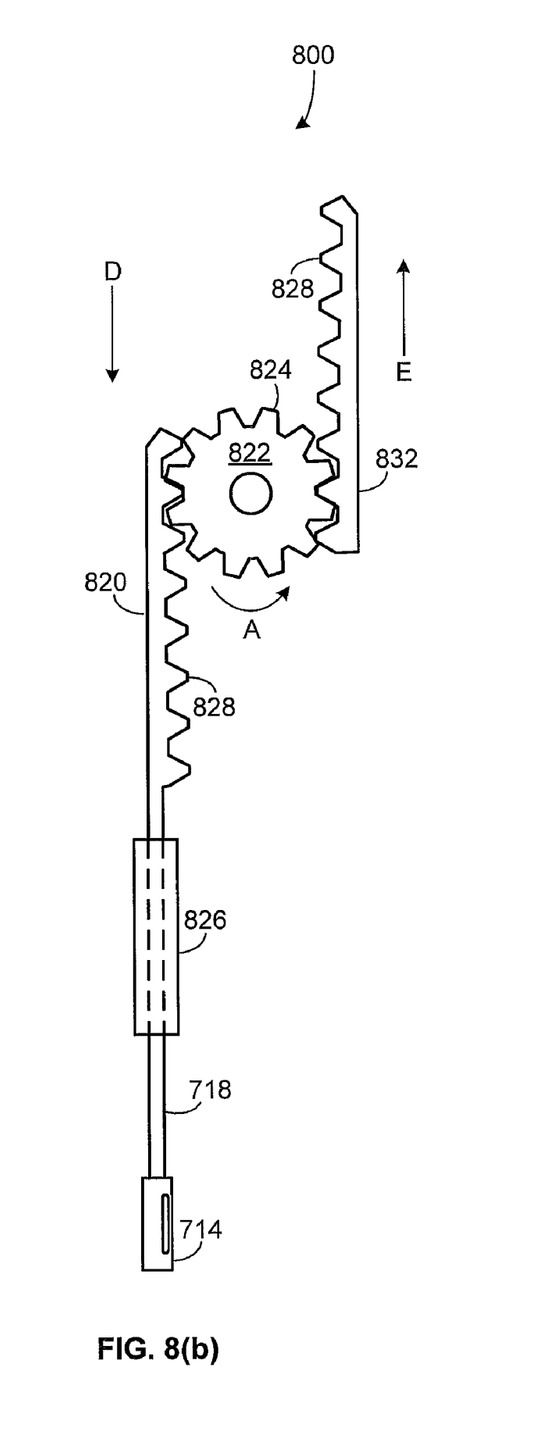

Opposite the first slide track 820 is a second slide track 832 that is slidably disposed within the first portion 704. Like the first slide track 820, the second slide track 832 can be fabricated from any suitable material. The second slide track 832 also has a plurality of slide track teeth 828 formed thereon for intermeshing engagement with gear teeth 824 of the gear 822.

As can be seen in FIGS. 8(a) and (b), the gear 822 is disposed between the first slide track 820 and the second slide track 832. Those of ordinary skill in the art will appreciate that the number of slide track teeth 828 and gear teeth 824 may be selected such that when the second portion 706 is slid to an open position, the microphone 714 is moved to a desired extended position and when the second portion 706 is slid to a closed position, the microphone 714 is moved to a desired retracted position. In an alternative embodiment, a transmission of gears can be used. This may be useful for small form factor telephones that cannot facilitate a single large gear, but may be able to facilitate a plurality of interconnected smaller gears.

Operation of the single gear auto-extending and auto-retracting microphone system 800 is as follows. To open the telephone 700 so as to make or receive a call, the user slides the second portion 706 of the housing 702 away from the first portion 704 (represented by arrow B in FIG. 7(a)). This movement exposes the keypad 712. Further, as the second portion 706 is slid away from the first portion 704, the second slide track 832, which is disposed within, and attached to, the second portion 706, moves in the B direction. This movement imparts a counterclockwise rotation of the gear 822. The counterclockwise rotation of the gear 822 causes the first slide track 820 to move in a direction opposite to the movement of the second slide track 832 (represented by arrow D in FIGS. 8(a) and (b). As the first slide track 820 moves, the extendible member 718 and consequently the microphone 714 is moved into a desired extended position. The movement of the slide track 820 and/or the extendible member 718 may be guided in a desired axial direction by the provision of one or more guide tubes 826. As mentioned previously, the extendible member 718 and the slide track 820 may be combined into a single element. When the user has completed the call, sliding the second portion 706 of housing 702 towards the first portion 704 (direction C) closes the telephone 700. This movement causes the microphone to be retracted into the illustrated guide tube 826 as the slide tracks 820, 832 and the gear teeth 824 move in directions opposite to those described above.

Figure 9A:
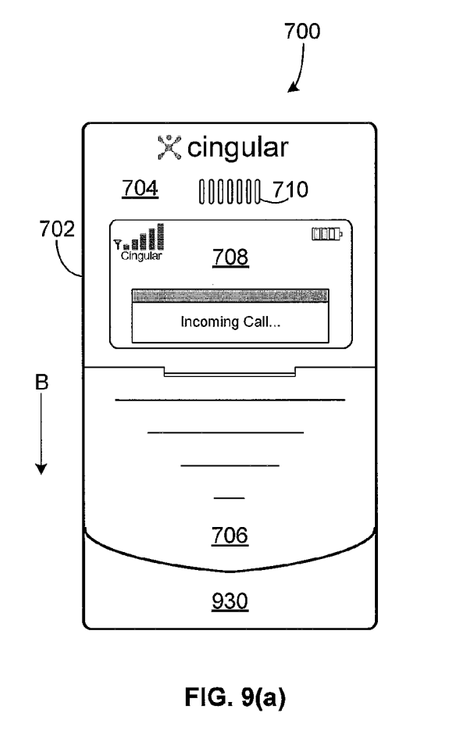
FIGS. 9(a) and (b) are perspective views of a "slide" style telephone in the closed and open positions, respectively, in accordance with another embodiment of the present invention.
Figure 9B:
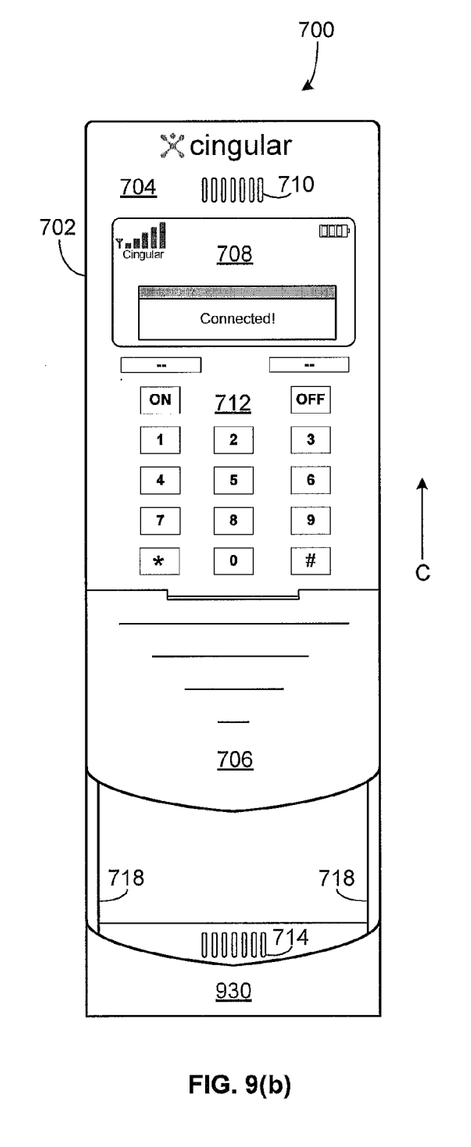

Referring now to FIGS. 9(a) and (b) there is depicted another embodiment of a "slide" style telephone 700, according to the present invention. FIG. 9(a) illustrates the telephone 700 in its closed, stand-by position, while FIG. 9(b) illustrates the telephone 700 in its open, operating position.

The telephone 700 has a body or housing 702 that consists of an upper, first portion 704 and a lower, second portion 706. Disposed on the first portion 704 may be a display 908 and a speaker 910. As best shown in FIG. 9(b), disposed on the first portion 704 may also be a keypad 712. These features are standard features present in prior art telephones. Thus, the construction and operation of such components will not be discussed in detail herein. However, the illustrated extendible microphone 714 is built-in to a third portion 930.

In this embodiment, the telephone 700 has cooperatively engaging tracks that are cooperatively disposed on the first portion 704 and the second portion 706 of the body 702. The engaging tracks facilitate the movement of the second portion 706 away from the first portion 704. As is apparent, when the second portion 706 of the housing 702 is slid to the open position, as shown in FIG. 9(b), the microphone 714 built-in to the third portion 930 is extended out of the housing 702. This extension occurs automatically when the user slides the second portion 706 to the open position.

Figure 10A:
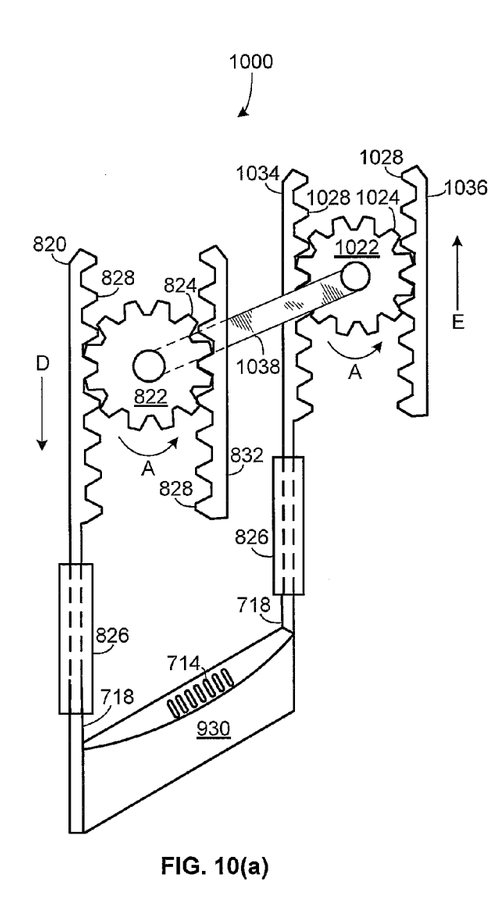
FIGS. 10(a) and (b) are perspective views of an auto-extending and auto-retracting microphone system for use in "slide" style telephone, in accordance with another embodiment of the present invention.

Referring now to FIGS. 10(a) and (b) there is depicted an embodiment of a dual gear auto-extending and auto-retracting microphone system 1000 of the present invention, for use in the "slide" style telephone 700 depicted in FIGS. 9(a) and (b). As can be seen, there is a first slide track 820 slidably disposed within the first portion 704 of the housing 702. The first slide track 820 can be fabricated from any suitable material. The first slide track 820 has a plurality of slide track teeth 828 formed thereon for intermeshing engagement with gear teeth 824 of a wheel or gear 822 rotatably mounted within the first portion 804 of the housing 802. One end of the first slide track 820 is affixed to the third portion 930 via an extendible member 718 or directly to the third portion 930 by any suitable means such as, but not limited to, adhesive, rivets, solder, clips, clamps, snaps, any combination thereof, and the like.

Figure 10B:
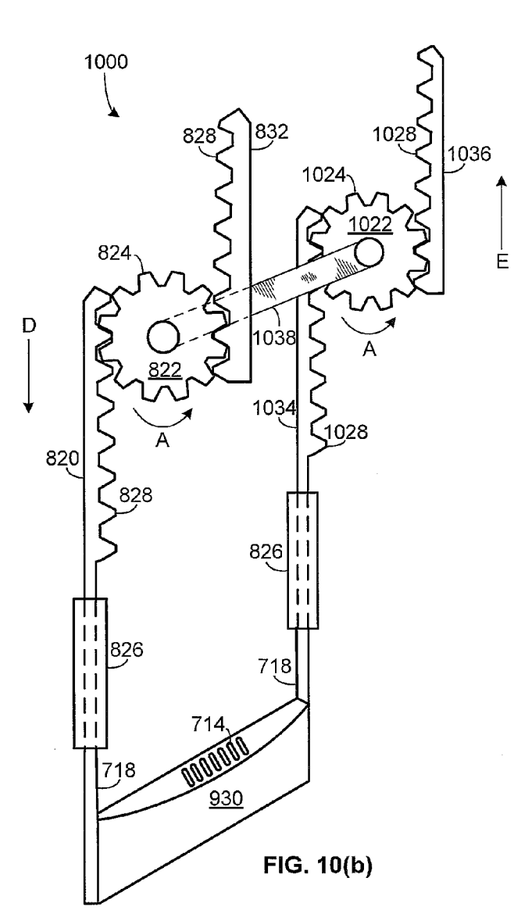

Opposite the first slide track 820 is a second slide track 832 that is slidably disposed within the first portion 704 of the housing 702. Like the first slide track 820, the second slide track 832 can be fabricated from any suitable material. The second slide track 832 also has a plurality of slide track teeth 828 formed thereon for intermeshing engagement with gear teeth 824 of the gear 822.

The first slide track 820, the second slide track 832, and the corresponding slide track teeth 828, the gear 822 and the corresponding gear teeth 824 combine to form a first tracking system that is disposed along one side of the housing 702. The other side of the housing facilitates a second tracking system that comprises a third slide track 1034 that is slidably disposed within the first portion 704 of the housing 702. The third slide track 1034 can be fabricated from any suitable material. The third slide track 1034 has a plurality of slide track teeth 1028 formed thereon for intermeshing engagement with gear teeth 1024 of a wheel or gear 1022 rotatably mounted within the first portion 704 of the housing 702.

Opposite the third slide track 1034 is a fourth slide track 1036 that is slidably disposed within the first portion 704 of the housing 702. Like the other slide tracks, the fourth slide track 1036 can be fabricated from any suitable material. The fourth slide track 1036 also has a plurality of slide track teeth 1028 formed thereon for intermeshing engagement with gear teeth 1024 of the gear 1022.

As can be seen in FIGS. 10(a) and (b), gear 822 is disposed between the first slide track 820 and the second slide track 832, and gear 1022 is disposed between the third slide track 1034 and the fourth slide track 1036. Those of ordinary skill in the art will appreciate that the number of slide track teeth 828, 1028 and gear teeth 824, 1024 may be selected such that when the second portion 706 is slid to an open position as shown in FIG. 9(b), the third portion 930 and the microphone 714 are moved to a desired extended position, and when the second portion 706 is slid to a closed position as shown in FIG. 9(a), the microphone 714 is moved to a desired retracted position. In an alternative embodiment, a transmission of gears can be used. This may be useful for small form factor telephones that cannot facilitate a single large gear, but may be able to facilitate a plurality of interconnected smaller gears. In addition, a support rod 1038 can be utilized to support the gears 822, 1022 as well as provide coherent movement between the two slide track systems.

Operation of the "slide" type dual gear auto-extending and auto-retracting microphone system 1000 is as follows. To open the telephone 700 so as to make or receive a call, the user slides the second portion 706 of the housing 702 away from the first portion 704 (represented by arrow B in FIG. 9(a)). This movement exposes the keypad 712. Further, as the second portion 706 is slid away from the first portion 704, the second and fourth slide tracks 832, 1036, respectively, which are disposed within and attached to the second portion 706, move in the E direction. This movement imparts a counterclockwise rotation of gears 822, 1022. The counterclockwise rotation of the gears 822, 1022 cause the first and third slide tracks 820, 1034, respectively, to move in a direction opposite to the movement of the second and fourth slide track 832, 1036 (represented by arrow D in FIGS. 10(a) and (b)). As the first and third slide tracks 820, 1034 move, the extendible member 718 and consequently the third portion 930 and the microphone 714 can be moved through one or more guide tubes 826 and to a desired extended position. When the user has completed the call, sliding the second portion 706 of housing 702 towards the first portion 704 (direction C) and closes the telephone. This movement causes the extendible member 718 to be retracted into the guide tube 826 as the slide tracks 820, 1034, 832, 1036 and corresponding gears 822, 1022 move in directions opposite to those described above.

Figure 11A:
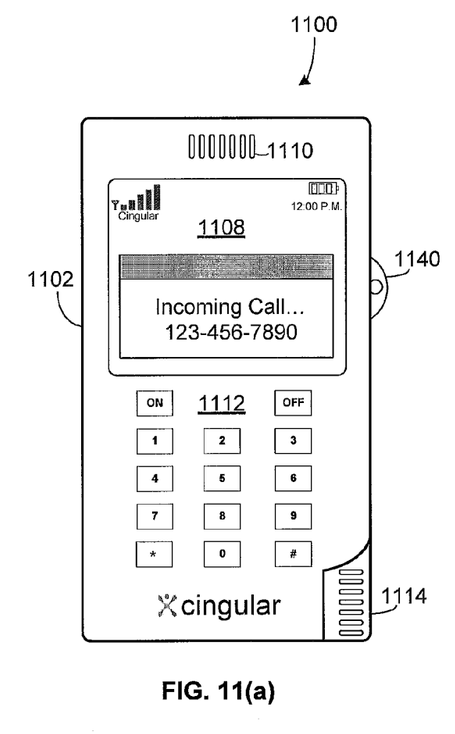
FIGS. 11(a) and (b) are perspective views of a manually extendible and retractable microphone system for use in a telephone, in accordance with an embodiment of the present invention.
Figure 11B:
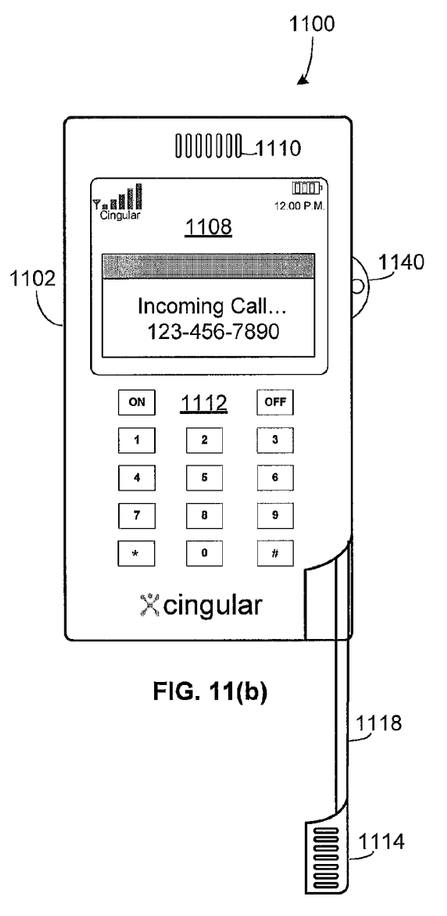

Referring now to FIGS. 11(a) and (b) there depicts an embodiment of an "open-face" style telephone 1100, according to the present invention. FIG. 11(a) illustrates the telephone 1100 with the microphone 1114 in its fully retracted position. FIG. 11(b) illustrates the telephone 1100 with the microphone 1114 in its fully extended position.

The telephone 1100 has a body or housing 1102. Disposed on the housing 1102 is a display 1108, a speaker 1110, and a keypad 1112. These features are standard features present in prior art telephones. Thus, the construction and operation of such components will not be discussed in detail herein. However, a microphone 1114 may be extendibly attached to the housing 1102, as shown in FIG. 11(a).

In this exemplary embodiment, the telephone 1100 has a scroll wheel 1140 that is disposed on a side of the housing 1102. When the user rotates the scroll wheel 1140, an extendible member 1118 with the microphone 1114 affixed thereto is extended, as shown in FIG. 11(b).

Figure 12:
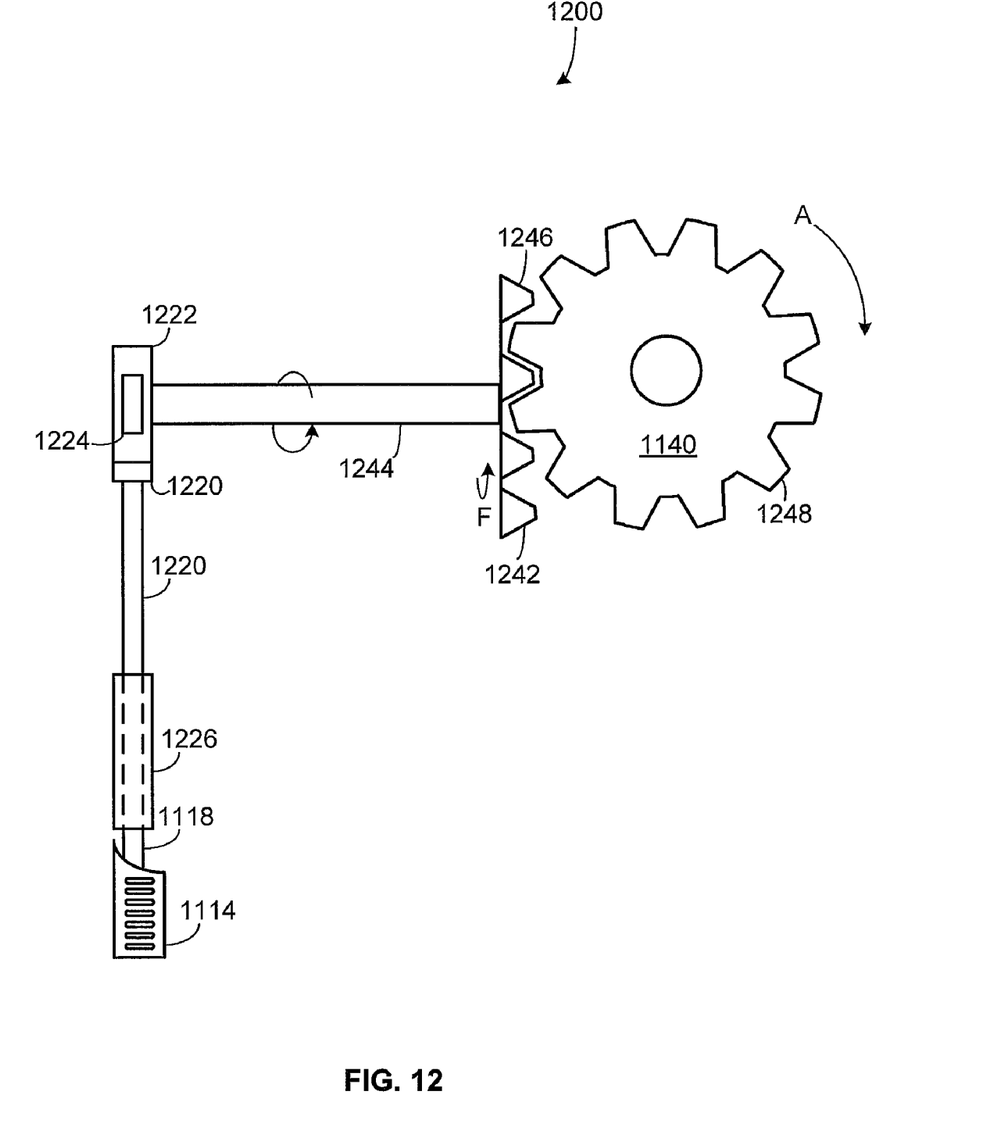
FIG. 12 is a front view of a manually extendible and retractable microphone system for use in a telephone, in accordance with an embodiment of the present invention.

Referring now to FIG. 12, there is depicted an exemplary embodiment of a manually extendible and retractable microphone system 1200 of the present invention. It should be understood that although system 1200 is described with reference to FIGS. 11(a) and (b), which depicts an "open-face" telephone 1100, the system 1200 can be implemented in, for example, "flip-open" and "slide" type telephones. As can be seen in FIG. 12, this exemplary embodiment includes an elongated slide track 1220 that has a plurality of slide track teeth (not shown) disposed therealong. One end of the slide track 1220 is affixed to the extendible member 1118 by any suitable means such as, but not limited to, adhesive, solder, rivets, clips, clamps, snaps, any combination thereof, and the like. It is contemplated that the extendible member 1118 and the slide track 1220 can be combined such that a portion of the slide track 1220 is fabricated without slide track teeth. It is further contemplated that the extendible member 1118 can be telescoping such that a plurality of section of decreasing diameter are used to minimize length in the retracted position and maximize length in the extended position. The material or combination of materials used to fabricate the extendible member 1118, the slide track 1220, and the slide track teeth can be any known to those skilled in the art. As previously described, the microphone 1114 is affixed to the extendible member 1118. The other end of the slide track 1220 is affixed to a wheel or gear 1222 by any suitable means such as, but not limited to, adhesive, solder, rivets, clips, clamps, snaps, friction, any combination thereof, and the like.

As seen in FIG. 12, the gear 1222 is disposed at one end of a scroll rod 1244. The gear 1222 has a plurality of gear teeth 1224 that intermesh with the slide track teeth. An intermediate gear 1242 that has a plurality of intermediate gear teeth 1246 is affixed to the other end of the scroll rod 1244. The intermediate gear teeth 1246 intermesh with scroll wheel teeth 1248 of the scroll wheel 1240. A scroll wheel rod (not shown) can be used to support the scroll wheel 1240.

When the scroll wheel 1240 is turned in clockwise, the intermediate gear 1242 is rotated in the direction of the arrow F, thereby rotating the scroll rod 1244 and consequently the gear 1222 in the same direction. The slide track 1220 is likewise rotated about the gear 1222. The slide track teeth (not shown) engage with the gear teeth 1224, thereby forcing the extendible member 1118 and the microphone 1114 to move linearly into the extended position. The movement of the slide track 1220 and/or extendible member 1118 may be guided by the provision of one or more guide tubes 1226. Conversely, when the scroll wheel 1140 is turned in the opposite direction, the slide track teeth engage with the gear teeth 1224, thereby retracting the extendible member 1118 and the microphone 1114 into the respective retracted positions, as shown in FIG. 11(a).

In an alternative embodiment, the scroll wheel 1240 can be directly engaged with teeth disposed upon the extendible member 1118. This embodiment eliminates the need for the gear 1222, the slide track 1220, the intermediate gear 1242, and the scroll rod 1244.

Electrical interconnection of the microphone 1114 with the internal electronics of the telephone 1100 may be provided with upper and lower contacts (not shown). The upper contact ensures electrical interconnection of the microphone 1114 when it is in a retracted position, while the lower contact maintains an electrical interconnection of the microphone 1114 when it is in an extended position, thus providing a useable microphone 1114 when the telephone is being used, for example, in a speaker phone mode.

In alternative embodiments, a motorized gear system is used to extend and retract the microphone. The motorized gear system is configured to operate via the use of any of the gear system described herein, modified to operate with a motor 228 (shown for example in FIGS. 3(a) and (b)) as opposed to the movements of one or more portions of the telephone.

In some embodiments, the motorized gear system includes a sensor to detect movement of a portion of the telephone to an open position and power-on the motor, thus extending the microphone. Likewise, when the sensor detects movement of a portion of the telephone to a closed position, the motor is powered-off. Further, the sensor settings may be made available to a user of the telephone via a user interface, for example, displayed on the telephone display. These settings allow the user to enable/disable this feature. A control such as a switch or button may also be used to activate/deactivate the motor. Other telephone types can benefit from such a system. One embodiment may utilize a button press to activate/deactivate the motor, wherein the button is pressed by the user and not activated via the movement of a portion of the telephone.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A microphone system for a telephone having a housing, the microphone system comprising:
   a flexible slide track having a plurality of first gear teeth and being slidably supported within the housing;
   a microphone having a portion thereof received within the housing and non-movably attached to an extendible member;
   a gear rotatably supported within the housing and in intermeshing engagement with the first gear teeth;
   a motor attached to the gear for turning the gear to extend/retract the microphone between a retracted position and an extended position;
   the extendible member including a plurality of sections of decreasing diameter, the extendible member being affixed to the flexible slide track and configured to telescope such that the plurality of sections of decreasing diameter minimize the length of the extendible member when the microphone is in a retracted position and maximize the length of the extendible member when the microphone is in an extended position; and
   a sensor, the sensor being configured to perform at least one of activation and deactivation of the motor.

2. The microphone system of claim 1, wherein the microphone comprises:
   a diaphragm configured to receive analog sound signals and convert the analog sound signals into electrical signals;
   an audio wire connected to the diaphragm; and
   a housing for enclosing and protecting the diaphragm and the audio wire.

3. The microphone system of claim 1 further comprising a guide tube mounted with the housing and slidably supporting the slide track therein.

4. A microphone system for a telephone having a housing, the microphone system comprising:
   a flexible slide track having a plurality of first gear teeth and being slidably supported within the housing;
   a microphone having a portion thereof received within the housing and non-movably attached to an extendible member;
   a gear rotatably supported within the housing and in intermeshing engagement with the first gear teeth;
   a motor attached to the gear for turning the gear to extend/retract the microphone between a retracted position and an extended position;
   the extendible member including a plurality of sections of decreasing diameter, the extendible member being affixed to the flexible slide track and configured to telescope such that the plurality of sections of decreasing diameter minimize the length of the extendible member when the microphone is in a retracted position and maximize the length of the extendible member when the microphone is in an extended position; and a control button, the control being configured to perform at least one of activation and deactivation of the motor.

5. The microphone system of claim 4, wherein the microphone comprises:

a diaphragm configured to receive analog sound signals and convert the analog sound signals into electrical signals;

an audio wire connected to the diaphragm; and a housing for enclosing and protecting the diaphragm and the audio wire.

6. The microphone system of claim 4 further comprising a guide tube mounted with the housing and slidably supporting the slide track therein.

* * * * *